United States Patent
Frank, Jr. et al.

(10) Patent No.: US 6,654,195 B1
(45) Date of Patent: Nov. 25, 2003

(54) DISK DRIVE HAVING A REGISTER SET FOR PROVIDING REAL TIME POSITION VARIABLES TO A HOST

(75) Inventors: Charles W. Frank, Jr., Irvine, CA (US); Thomas D. Hanan, Mission Viejo, CA (US); Robert W. Warren, Jr., Rochester, MN (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/300,179

(22) Filed: Apr. 27, 1999

(51) Int. Cl.$^7$ .............................. G06F 13/00; G11B 5/02
(52) U.S. Cl. .............................. 360/75; 703/21; 703/27; 700/34; 360/59; 360/77.02; 360/78.04
(58) Field of Search .............................. 703/24, 25, 27, 703/21; 711/114, 162; 360/75, 77.02, 77.08, 78.04, 59; 700/34, 42, 43; 369/13.11; 364/43; 710/305

(56) References Cited

U.S. PATENT DOCUMENTS

| | | | |
|---|---|---|---|
| 5,367,669 A | * 11/1994 | Holland et al. | 395/575 |
| 5,390,313 A | 2/1995 | Yanai et al. | |
| 5,412,666 A | * 5/1995 | Squires et al. | 371/37.4 |
| 5,444,583 A | * 8/1995 | Ehrlich et al. | 360/78.09 |
| 5,548,795 A | * 8/1996 | Au | 395/872 |
| 5,586,306 A | 12/1996 | Romano et al. | |
| 5,696,931 A | 12/1997 | Lum et al. | |
| 5,729,718 A | * 3/1998 | Au | 395/494 |
| 5,737,747 A | 4/1998 | Vishlitzky et al. | |
| 5,761,692 A | 6/1998 | Ozden et al. | |
| 5,787,482 A | 7/1998 | Chen et al. | |
| 5,819,310 A | * 10/1998 | Vishlitzky et al. | 711/114 |
| 5,854,941 A | 12/1998 | Ballard et al. | |
| 5,909,336 A | * 6/1999 | Schaffner et al. | 360/77.08 |
| 5,909,564 A | 6/1999 | Alexander et al. | |
| 5,909,691 A | * 6/1999 | Schultz et al. | 711/4 |
| 5,941,972 A | 8/1999 | Hoese et al. | |
| 5,996,014 A | 11/1999 | Uchihori et al. | |
| 6,049,436 A | * 4/2000 | Wu | 360/27 |
| 6,128,717 A | * 10/2000 | Harrison et al. | 711/202 |
| 6,421,711 B1 | 7/2002 | Blumenau et al. | |
| 6,487,029 B1 | * 11/2002 | Wu | 360/27 |

FOREIGN PATENT DOCUMENTS

EP        0 757 310 A2        2/1997

* cited by examiner

Primary Examiner—Kevin J. Teska
Assistant Examiner—Thai Phan
(74) Attorney, Agent, or Firm—Milad G. Shara, Esq.; Robroy R. Fawcett, Esq.

(57) ABSTRACT

A disk drive provides head position information as position status variables to a host. The position status variables are derived from information formatted on a disk and processed by a media controller for storage in a position register set. The position information includes both radial and circumferential position references. The disk drive is connected to the host over a host interface which enables the position information to be stored automatically in a host memory so that the host can scan the position information to determine an optimum order of data transfer commands to be sent to the disk drive. A method for selecting a next command to transmit to a disk drive employs the position variables to optimize the command selection. In an alternative method, a host selects a command to be executed by one of an array of disk drives and then determines the disk drive to receive the command based on position information variables which have been stored and updated by the disk drives in the array.

27 Claims, 7 Drawing Sheets

SERVO SECTOR

DISK DRIVE HAVING A REGISTER SET FOR PROVIDING REAL TIME POSITION VARIABLES TO A HOST

BACKGROUND

1. Field of the Invention

The invention relates to disk drives in computer systems. In particular the invention relates to disk drives in computer systems which provide real time status information to hosts.

2. Description of the Related Art

Disk drives provide non-volatile storage of large volumes of digital data in computer systems. Using a transducer head, data is recorded on and retrieved from a plurality of concentric data tracks, disposed on a rotating disk surface. The transducer head is moved radially to hover over a selected data track using an actuator. Data is written on or read from a selected portion of the track when the selected portion passes under the head.

The performance of a disk drive is to a large extent dependent on mechanical latency. One aspect of mechanical latency is called seek time, which is the time required to move the head to a target track from a current track. Another aspect of mechanical latency is rotational delay, which is the time required for a targeted portion of a data track to pass under the head once the head is on track. A great deal of effort has been expended in the disk drive art to minimize mechanical latency including rotating disks at higher rates to reduce rotational delay, and designing actuators with efficient voice coil motors and low mass to improve seek time.

Despite design improvements which reduce mechanical latency, the aforementioned mechanical delays continue to dominate the potential performance of a disk drive. Recognizing this, many efforts have been made to minimize the effects of mechanical latency by optimizing the order of operations performed by the disk drive in response to commands from a host. Disk drives have internal microprocessors which provide a degree of intelligence which can be deployed to inspect a queue of commands and construct a plan for reducing latency by executing the commands in a more efficient order than that in which they were received. European patent application EP 0757310A2 to Hewlett Packard company describes a number of disk scheduling algorithms which can be employed to optimize the order of commands in a queue.

Although these and other algorithms employed within the disk drive have somewhat mitigated mechanical latency, there remain barriers to achieving maximum performance. For one, host systems which manage disk drive operations do not have specific knowledge of the physical configuration of the drive. That is, the host accesses data on the drive by referencing logical block addresses, or in older systems as a Cylinder-Head-Sector address which is not literal but must be translated into a specific configuration within the drive. In either case, the host cannot effectively participate in reducing mechanical latency because the actual drive configuration is opaque. U.S. Pat. No. 5,390,313 to Yanai et al discloses a data mirroring arrangement including rotational position indicators for selecting which of an array of disk drives is at a rotational position to access data in the least time. The system disclosed by Yanai et al however relies on reducing access time through offsetting the relative angular phase of two or more disks with mirrored data which are synchronously rotated to achieve a reduced statistical average access time. Further, the Yanai system relies on a disk adapter/controller to process the position information and does not provide such information to a host.

Another barrier to achieving maximum performance in a disk drive is the processing capability of the disk drive microprocessor. The ability of a disk drive to intelligently manage host-commanded operations is ultimately constrained by competitive economic factors which may limit the bandwidth or overall computing capability which can be practically provided in the disk drive. Such factors limit the microprocessor type and speed selected for managing the disk drive and the amount and speed of memory for program execution. Another limiting factor is that the disk drive microprocessor must respond to real time demands from internal servo functions which limit bandwidth even when separate servo and interface control microprocessors are used.

There remains a need therefore for a cost effective apparatus in a disk drive which permits more closely achieving maximum performance by enabling host interaction for reducing the effects of mechanical latency.

SUMMARY OF THE INVENTION

This invention can be regarded as a disk drive connectable to a host via a host interface for receiving data transfer commands and for communicating position status variables in the disk drive. The disk drive comprises a head disk assembly and a media controller.

The head disk assembly further comprises a disk being formatted to define a plurality of discrete radial positions at which data is recorded in a data track and a spindle motor for rapidly rotating the disk. Each data track is formatted to define a plurality of equally spaced-apart servo sectors, each of which defines a wedge relative to an index. Each track is further formatted to define a plurality of data sectors having sync marks, each sync mark defining a discrete circumferential position between the servo sectors.

The media controller further comprises a servo system for controllably positioning the transducer head and having a means for determining the position status variables. The position status variables comprise the discrete radial position currently passing under the head and the wedge currently passing under the head. The media controller further comprises a means for storing the position status variables a means for providing the stored position status variables to the host computer. The invention thereby enables the host computer to be informed of the position status variables for optimizing the data transfer commands.

In another aspect, the invention can be regarded as a computer system comprising a host computer and the disk drive. The computer system comprises a host interface connecting the disk drive to the host computer and the disk drive provides the position status variables to a host memory in the host computer. Preferably the disk drive provides the position status variables to the host computer automatically. Suitably, the host interface can be a SCSI, ATA, P1394, PCI or Fibre Channel interface.

The invention can also be regarded as a method of optimizing data transfer commands sent to a disk drive in a computer system comprising a host having a host memory and a disk drive. The method comprises the steps of: storing disk drive formatting information in the host memory; storing disk drive performance parameters in the host memory; shadowing rotational and radial position information in the disk drive; periodically updating a portion of the host memory to store the shadowed rotational and radial position information. While periodically updating the portion of host memory, the method further comprises the steps of storing a queue of disk drive data transfer commands in the host memory; scanning the queue of disk drive data transfer commands; and calculating a next disk drive data transfer command to execute from the queue of disk drive data transfer commands based on the updated shadowed rotational and radial position information and the disk drive performance parameters. The method concludes by transmitting the next disk drive data transfer command to the disk drive.

In yet another aspect, the invention can be viewed as a method of optimizing data transfer commands sent to an array of disk drives in a computer system comprising a host having a host memory and a plurality of disk drives. The method comprises the steps of: storing formatting information for each of the plurality of disk drives in the host memory; storing disk drive performance parameters for each of the plurality of disk drives in the host memory; shadowing rotational and radial position information in each disk drive; periodically updating a portion of the host memory to store the shadowed rotational and radial position information for each disk drive. While periodically updating the portion of host memory, the method further comprises the steps of: storing a queue of disk drive data transfer commands which can be applied to any of the plurality of disk drives in the host memory; selecting a next data transfer command from the queue of disk drive data transfer commands; selecting a one of the plurality disk drives to receive the next data transfer command based on the updated shadowed rotational and radial position information and the disk drive performance parameters; and transmitting the next disk drive data transfer command to the selected disk drive.

The method may be applied to an array of disk drives having different performance and formatting parameters and may be applied with either mirrored or non-mirrored data security algorithms.

DETAILED DESCRIPTION

Figure 1:
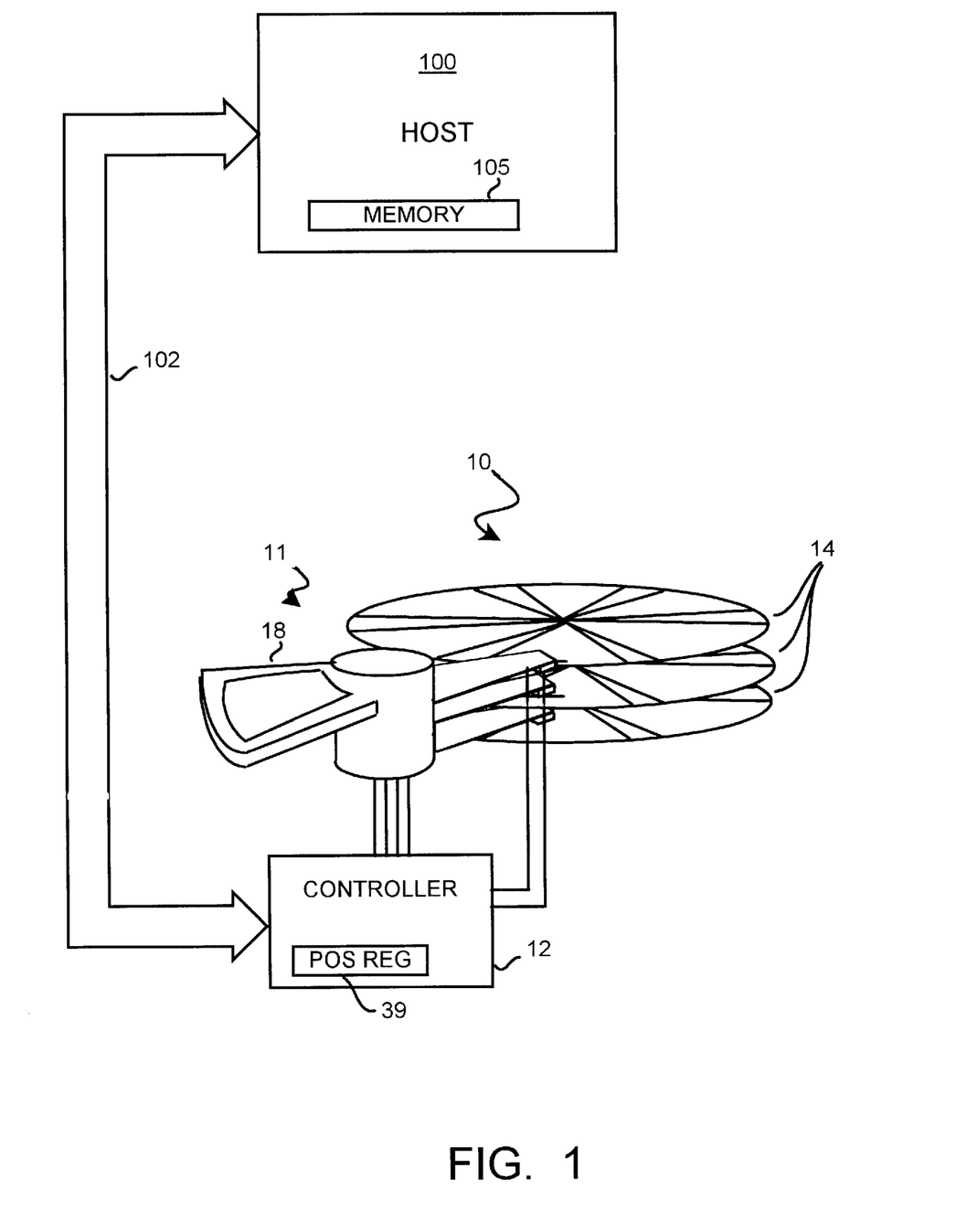
FIG. 1 is a block diagram showing a computer system in accordance with the invention comprising a disk drive connected to a host.

FIG. 1 shows a disk drive 10 connected to a host 100 by host interface 102. Host 100 has a host memory array 105 for storing programs and data. Disk drive 10 includes a media controller 12, and a head disk assembly (HDA) 11 comprising a voice coil motor (VCM) 18 and disks 14. Host 100 is suitably a microprocessor based computer system which provides commands to disk drive 10 for recording and retrieving data on one or more disks 14. Host 100 and disk 10 communicate with each other over a host interface path 102. Host interface path 102 is preferably a memory-referenced interface such as a peripheral component interconnect (PCI) interface. Other interface standards can be used with the invention such as SCSI, ATA, Fibre Channel or 1394 interfaces, commonly employed in connecting disk drives to hosts. A position register set 39 in media controller 12 provides information to host 100 for optimizing operations in disk drive 10. The use of the invention with host interface path 102 will be discussed in more detail below.

Figure 1A:
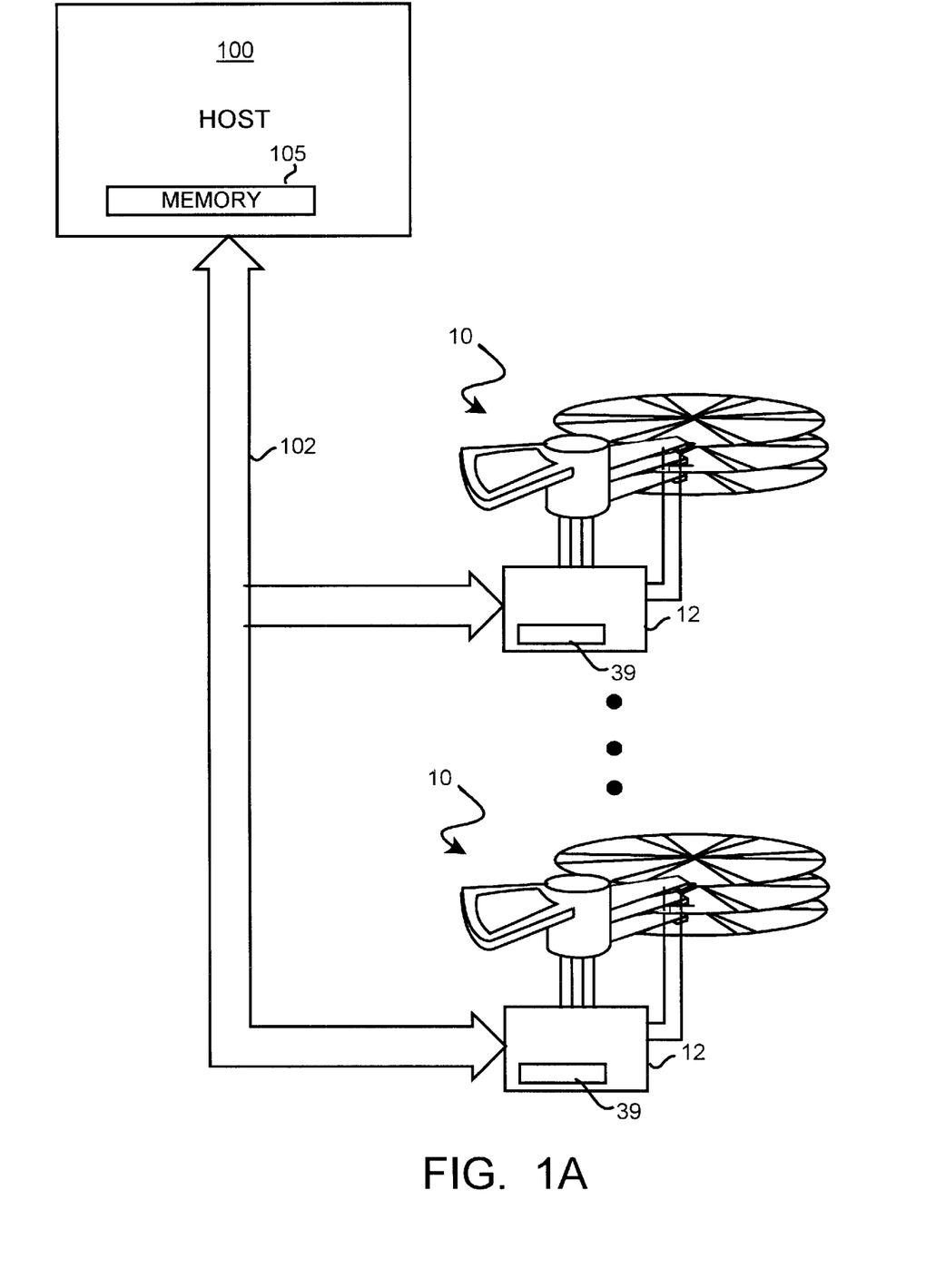
FIG. 1A is a block diagram showing a computer system in accordance with the invention comprising a plurality of disk drives connected to a host.

FIG. 1A shows an alternative embodiment of the invention with a plurality of disk drives 10 connected to a host 100 via a host interface 102. Each disk drive 10 has a position register set 39 for providing position information to host 100.

Figure 2:
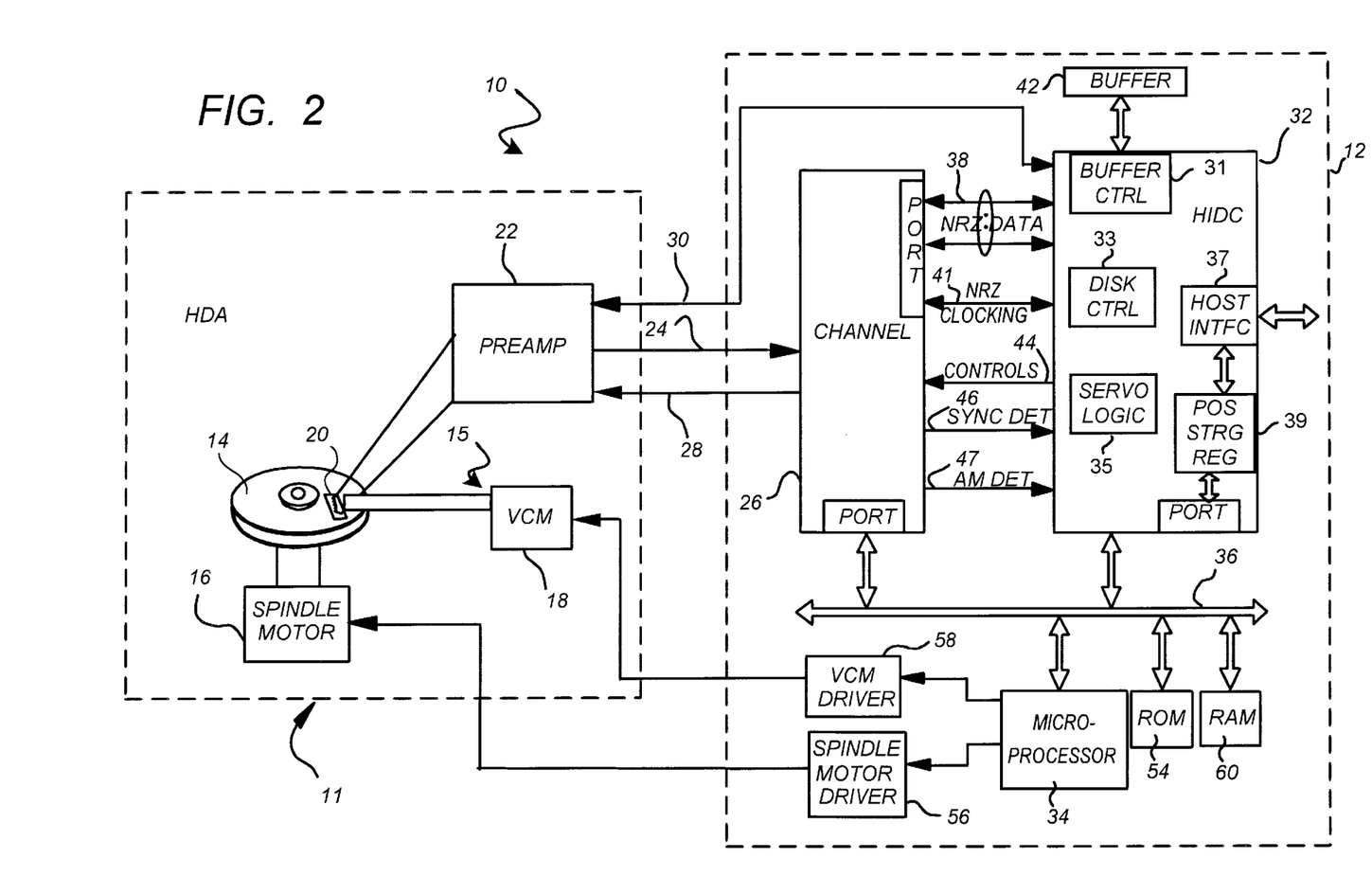
FIG. 2 is detailed block diagram of the disk drive of FIG. 1 including media controller 12 having real-time position registers used to provide the host with visibility into disk drive operations.

Now turning to FIG. 2, a more detailed block diagram of disk drive 10 is shown. HDA 11 has a VCM 18 which forms part of an actuator assembly 15 to position a head 20 over a surface of a disk 14. Preferably disk drive 10 has multiple disks 14, each surface of which has a corresponding head 20 swung in unison over disks 14 by actuator 15. The disks 14 are rotated by a spindle motor 16. A preamplifier 22 is mounted to provide an interface to head 20 for providing write signals and amplifying read signals. Multiple heads 20 may be connected to preamplifier 22 for selection by media controller 12. A read signal path 24, a write signal path 28, and a control path 30 are provided between preamplifier 22 and media controller 12.

Media controller 12 comprises electronic circuits for controlling the elements discussed in HDA 11 and for interfacing to host 100. The circuit elements in media controller 12 are shown as a particular set of separate blocks for ease in explanation, however the actual physical integration of the various blocks is optional and can be optimized in any integrated circuit arrangement which provides beneficial economics while maintaining the advantages of the invention.

Media controller 12 has a channel 26, a host interface and disk controller (HIDC) 32, a buffer 42, a microprocessor 34, a ROM 54, a RAM 60, a spindle motor driver 56, and a VCM diver 58. Channel 26 provides conventional data encoding-decoding functions for translating between digital data in media controller 12 and amplified media level signals processed in preamplifier 22. For example, during write operations channel 26 provides an encoded string of signals to preamplifier 22 which are sent to head 20 for recording on disk 14. For a read operation, signals follow a reverse order to allow channel 26 to decode signals read by head 20 on disk 14 and amplified by preamplifier 22 into digital data which can be processed by HIDC 32 and microprocessor 34.

Digital data is synchronously transmitted between channel 26 and HIDC 32 via a NRZ data bus 38 in conjunction with an NRZ clock 41 in a conventional manner. HIDC 32 comprises disk controller or formatter logic 33 which uses internal timers and signals from channel 26 to maintain tracking of the position of head 20 over formatted areas of disk 14 including data tracks, servo sectors and data sectors as described in more detail below. Additionally, HIDC includes logic for processing servo sectors 35, control logic 31 for interfacing to buffer 42, and host interface control logic 37 for interfacing to host 100.

Microprocessor 34 serves to manage the operations of disk drive 10 including processing of commands from host 100. In one embodiment microprocessor 34 interacts with servo logic 35 to control the position of head 20 over disk 14 through VCM driver 58 which provides current to VCM 18. Microprocessor 34 also controls the speed of spindle motor 16 through circuits in spindle motor driver 56. In another embodiment, an additional microprocessor may be used to provide dedicated bandwidth for servo functions. ROM 54 and RAM 60 provide respective read-only and read/write memory for programs executing in microprocessor 34. A bus 36 provides a path for microprocessor 34 to communicate commands, data and status with channel 26 and HIDC 32.

Buffer 42 provides temporary storage for data being transferred between host 100 and HDA 11. Disk controller 33 provides error correction logic for appending syndrome bytes to digital data recorded on disk 14 and for applying error correction algorithms on data read from disk 14 to ensure that corrected data is stored in buffer 42 for transmission to host 100. Host interface logic 37 transfers data between host 100 and buffer 42.

Preferably, media controller 12 operates cooperatively with host 100 to schedule operations in disk drive 10 such that an optimized sequence of commands is sent to disk drive 10 to minimize the effects of mechanical latency. This can allow for cost reductions in media controller 12 such as reducing the size of ROM 54, RAM 60, and buffer 42 as well as reducing the cost and complexity of microprocessor 34. In order to enjoy the benefit of host scheduling, media controller 12 provides position information from a position storage register set 39 in HIDC 32.

Figure 3:
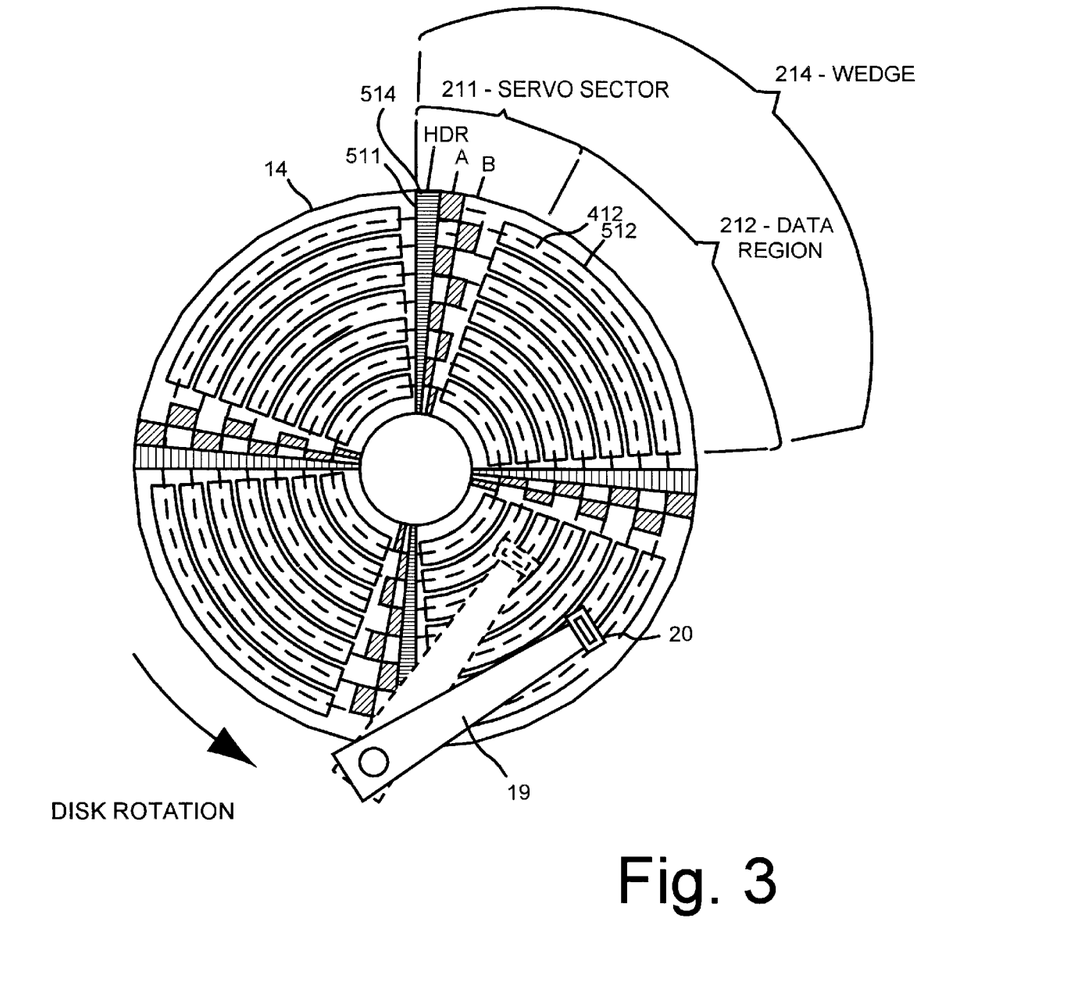
FIG. 3 is a disk surface of the disk drive of FIG. 1 showing formatting features which are used in establishing the radial and rotational position of the actuator mounted head transducer for use by the host.

The manner in which position information is obtained and stored in position storage register set 39 is best understood by an explanation of FIG. 3, showing a formatted surface of disk 14 having an embedded servo format. A plurality of concentric data tracks 512 is disposed on disk 14. Each data track 512 is interrupted at equal intervals by a servo sector 511 (four shown). Collectively, the servo sectors 511 form a servo sector region 211 extending from an outer diameter (OD) of the disk 14 to an inner diameter.(ID). Similarly the collective intervals between servo sectors 211 form data regions 212 in which data is recorded in discrete units called data sectors 412. The collective interval between servo wedges 211, including data wedge 212 is sometimes simply termed as a wedge 214. One servo sector 511 in each track is formatted to serve as an index 514 thereby providing a reference for establishing a rotational position as will be further explained below. The number of tracks and wedges shown in FIG. 3 is of course only illustrative of formatting conventions. Actual realized surface formats may range from 60 to 90 or more servo regions 211 and may provide thousands of data tracks 512. As is well known, the number of data sectors 412 in each data track 512 is variable, depending on zone formatting to provide efficient use of recording media.

The position of head 20 moved by actuator assembly 15 on an arm 19 is thus apparent from FIG. 3. Head 20 is moved to hover over a specific data track 512 during a seek operation thereby establishing a radial position of head 20, referenced as a track or "cylinder" number. A rotational position of head 20 relative to formatted elements of disk 14 is established as each component servo sector 511 or data sector 412 passes serially under the head. Index 514 establishes a reference starting rotational position for each track.

Figure 4:
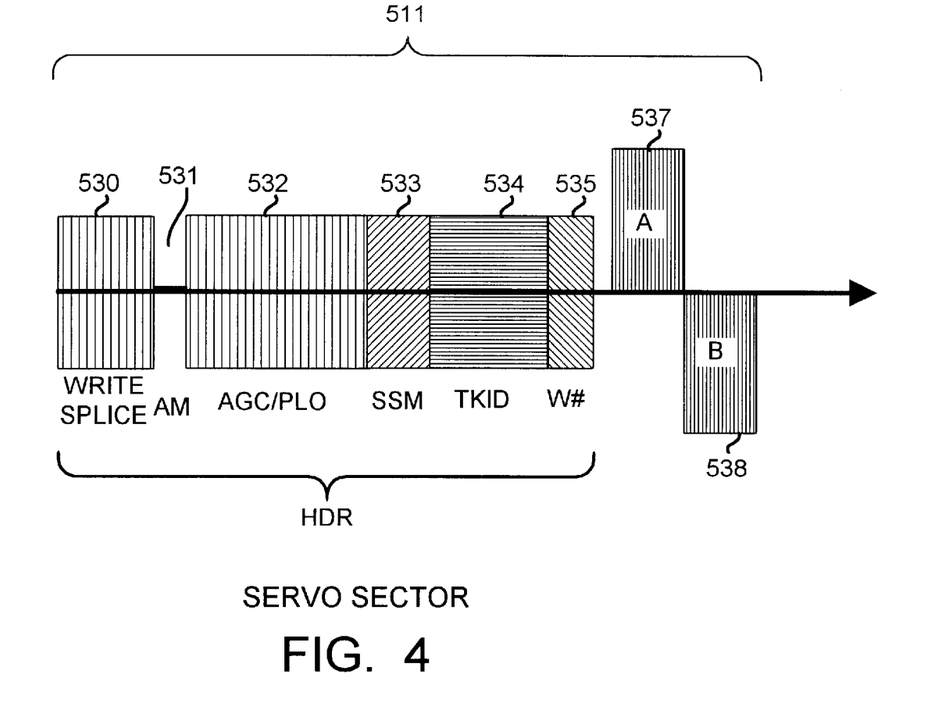
FIG. 4 is a detailed diagram of a servo sector formatted on the disk of FIG. 3.

FIG. 4 shows a detailed view of servo sector 511. A write splice region 530 provides a buffer zone to separate the servo sector 511 from a preceding data sector 412. An address mark (AM) 531 field provides for framing and timing functions in channel 26. An AGC/PLO field 532 provides for gain setting and phase locked loop bit synchronization to the recorded servo sector data. Servo Sync Mark (SSM) field 533 provides for positive detection and byte synchronization of servo sector 511. A track identification field TKID 534 provides verification of the track or cylinder number (i.e. radial position) being read. TKID field 534 is coded using a gray code to allow for a head 20 straddling two TKID fields 534. Although the decoded field 534 may be ambiguous within a one track range in this event, servo firmware is able to determine an absolute cylinder reference by reading servo burst fields for fine positioning, two of which—A burst 537 and B burst 538—are shown. Preferably, a wedge number (W#) field 537 provides a rotational position verification reference for the servo sector 511 and in one embodiment can be encoded to identify an index servo sector 514. Alternatively, SSM field 533 can be encoded to provide an index 514. Collectively, fields 530–535 form a header (HDR) for servo field 511.

Figure 5:
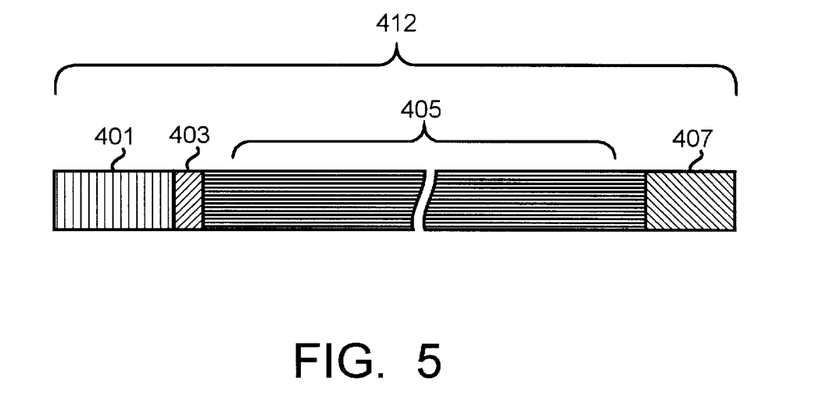
FIG. 5 is a detailed diagram of a data sector formatted on the disk of FIG. 4.

FIG. 5 shows a detailed diagram of a data sector 412. An AGC/PLO field 401 provides for AGC gain setting and phase locked loop locking to the data sector frequency to produce a bit clock. A frame sync mark (FSM) 403, when detected by channel 26, provides a positive indication of a data sector start and defines a byte or word boundary for subsequent data. A data field 405 provides for user data storage and is preferably 512 bytes. Other data field sizes may be implemented for use with the invention. An ECC field 407 provides for error correction redundancy bytes generated in disk controller logic 33.

Now returning to FIG. 2, channel 26 provides signals AM DET 47 and SYNC DET 46 to HIDC 32. AM DET 47 is asserted on detection of a valid address mark field 531 in servo sector 511. AM DET 47 provides for framing a servo sector window, while SYNC DET 46 is asserted on detection of a valid SSM 533 in a servo sector 511 or FSM 403 in a data sector. For servo sectors 511, a special character such as a FCH (H=hexadecimal) is transmitted on NRZ bus 38 to indicate the start of servo sector data transmission to HIDC 32. Similarly, during data sector read operations, channel 26 asserts SYNC DET 46 when FSM 403 is detected and transmits a FCH character preceding user data bytes on NRZ bus 38. For write operations, HIDC 32 transmits the FCH character preceding user data bytes on NRZ bus 38 to channel 26 for writing FSM 403 and user data on disk 14.

HIDC 32 maintains position register set 39 for storing rotational and radial position information which is available to host 100. In one embodiment, rotational position information is received as W# field 537 while reading each servo sector 511. A portion of position register set 39 "shadows" (i.e. copies the last state of) W# field 537 and stores an updated value for each servo sector read. Similarly, position register set 39 shadows each TKID field 534 to store an updated value for radial (track or cylinder) position information. Preferably, servo logic 35 provides additional status in position register set 39 to identify a currently selected head and transient conditions which might be relevant to a future operation. Such transient conditions could include an "offtrack" status which indicates that the selected head is not within budgeted limits of offset from a track centerline, or other conditions which indicate readiness to perform read or write operations. Preferably, position register set 39 stores a "time stamp" reference which may be inspected by host 100 to verify that the position information is valid—e.g. that an update has occurred within an expected interval.

Host 100 can receive the position information from disk drive 10 by periodically "polling" the position register set 39, however a preferred method is for disk drive 10 to provide the information in a "push" manner through a master mode operation which acquires control of host interface bus 102 through host interface logic 37 and transmits control and data sequences which result in the position information being stored in host memory 105 without requiring polling by host 100. Thus armed with a radial (TKID field 534) and rotational (W# field 535) position reference, the full processing power of host 100 can be employed to scan memory 105 at any time to anticipate the position of head 20 in disk drive 10 relative to the formatted disk 14 within reasonably accurate limits and make decisions on an optimal order of commands for data transfer. Preferably, during system initialization, host 100 is provided with a full set of information characterizing the physical format of disk 14 and salient performance characteristics of disk drive 10 including rotational speed and seek parameters.

In an alternate embodiment, the granularity of position information maintained in position register set 39 can be increased by adding a field which is automatically updated with each SYNC DET 46 assertion for data sectors detected during read operations. In this manner a finer grained position reference can be added to each wedge indication.

Host interface bus 102 can be any bus which, in combination with host interface logic 37 in disk drive 10 and host interface logic in host 100 (not shown), permits data from disk drive 10 to be transferred to host memory 105 without CPU intervention. Such buses can be a P1394 bus, a PCI bus, or a derivative of currently used disk drive interfaces such as ATA, SCSI, or Fibre Channel. Preferably host interface logic 37 transmits the position information automatically to host 100 upon each servo sector update.

Figure 6:
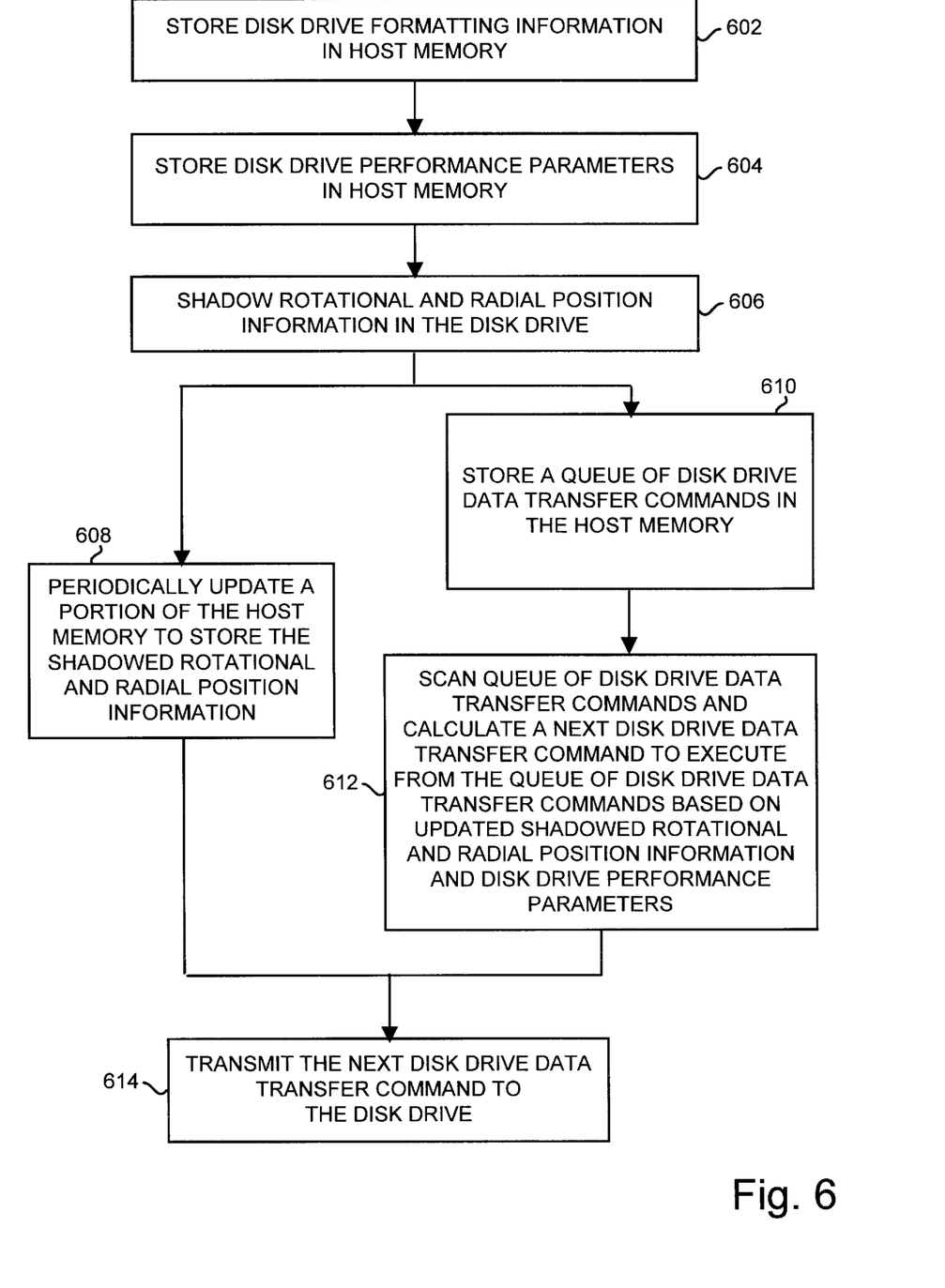
FIG. 6 is a flow chart showing the method of the invention to scan a queue of commands in a host to select a next data transfer command for a disk drive based on shadowed position information provided by the disk drive

FIG. 6 illustrates in flow chart form the method of the invention for optimizing data transfer commands sent to a disk drive by a host as in the system configuration of FIG. 1. In step 602, formatting information for the disk drive is stored in host memory. In step 604, performance parameters such as spindle speed and seek profiles are stored in a portion of host memory. The performance parameters enable a host to calculate projected positions or expected execution time of operations in the disk drive. At step 606, the disk drives begin to shadow its rotational and radial position information as previously discussed. While periodically updating the portion of host memory with position information at step 608, the host stores a queue of disk drive data transfer commands at 610, and scans the queue at 612 to calculate a next command to execute based on the updated position information. At step 614, the method transmits the next command to the disk drive having determined the optimum command to execute based on current position information.

Figure 7:
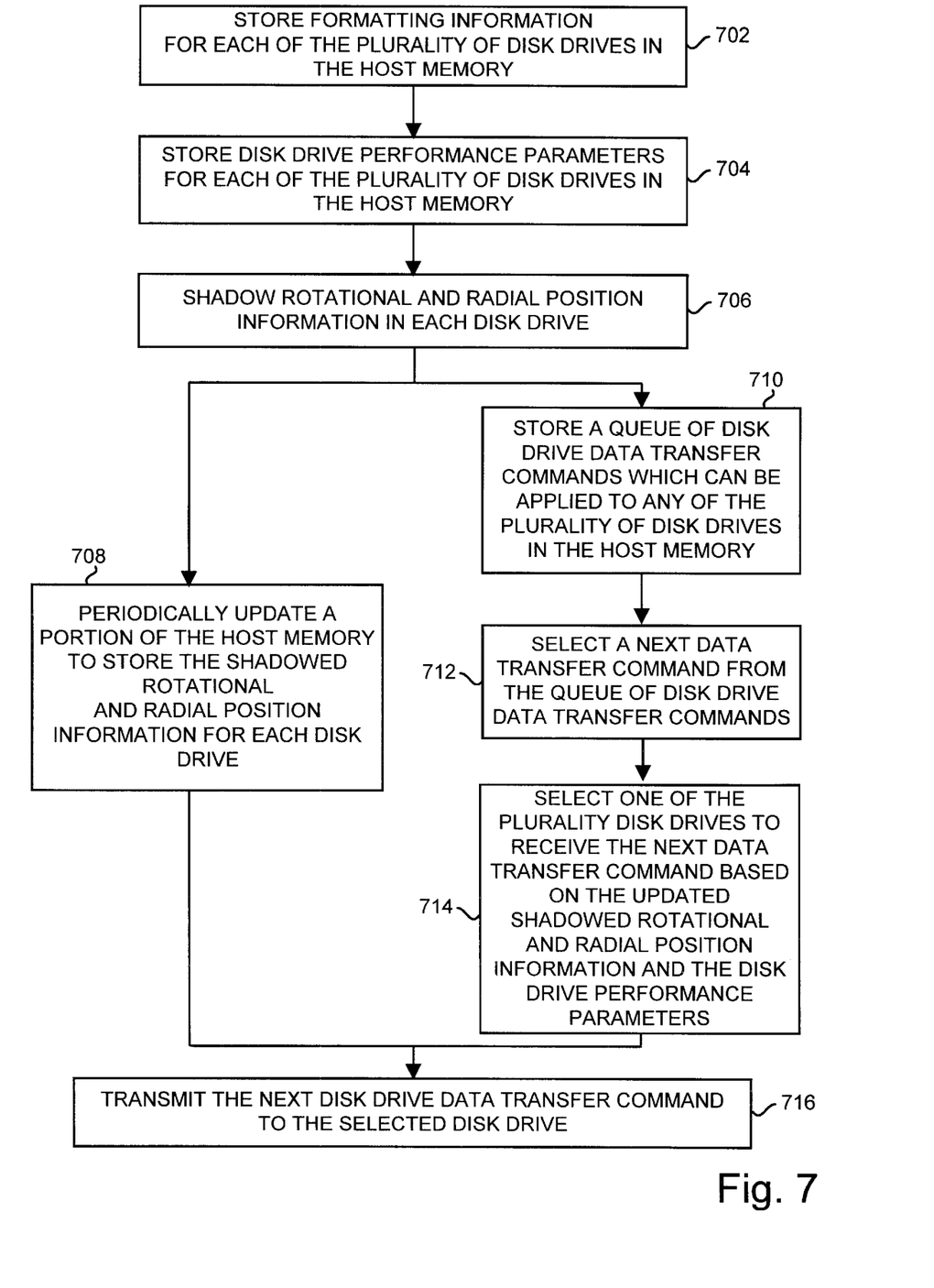
FIG. 7 is a flow chart showing the method of the invention for a host to select a next data transfer command from a queue and select one of a plurality of disk drives to receive the command based on shadowed position information and performance information provided by the disk drives.

In FIG. 7 a method for optimizing data transfer commands sent to an array of disk drives by a host as in the system of FIG. 1a. The method begins at step 702 by storing formatting information for each disk drive in host memory. In step 704, the host stores performance parameters for each disk drive. At step 706, each disk drive begins shadowing its position information. At step 708, a portion of host memory is periodically updated to store the shadowed position information. While the updating is being done, the host stores a queue of disk drive data transfer commands at 710 and selects at 712 a next data transfer command from the queue. Next at 714, the host selects one of the disk drives to receive the next data transfer command based on the updated position information. Then at 716, the host transmits the next data transfer command to the selected disk drive. In the method shown in FIG. 7, a host can effectively reduce mechanical latency overhead through its knowledge of real-time position information and drive characteristics. The method may be practiced even with a non-uniform array of disk drives, i.e. having differing performance and formatting characteristics, and without requiring that data be mirrored on the disk drives.

We claim:

1. A disk drive connectable to a host computer via a host interface for receiving data transfer commands and for communicating position status variables in the disk drive, the disk drive comprising:
   a head disk assembly;
   a media controller;
   the head disk assembly comprising:
      a disk;
      a spindle motor for rapidly rotating the disk;
      the disk being formatted to define a plurality of discrete radial positions at which data is recorded in a data track;
      each data track being formatted to define a plurality of equally spaced-apart servo sectors, each servo sector defining a wedge relative to an index;
      each data track being formatted to define a plurality of data sectors having sync marks, each sync mark defining a discrete circumferential position between the servo sectors;
   the media controller comprising;
      a servo system for controllably positioning the transducer head over a cylinder rotating under the head;
      a means for determining the position status variables;
      the position status variables comprising:
         the discrete radial position currently passing under the head the wedge currently passing under the head;
      a means for storing the position status variables; and
      a means for providing the stored position status variables to the host computer;
whereby the host computer can be informed of the position status variables for optimizing the data transfer commands.

2. The disk drive of claim 1 wherein the position status variables further comprise the discrete circumferential position between servo sectors.

3. The disk drive of claim 1 wherein the position status variables further comprise a time stamp.

4. The disk drive of claim 1 wherein the means for providing the stored position status variables comprises bus mastering logic.

5. The disk drive of claim 1 wherein the means for providing the stored position status variables comprises polling logic.

6. A computer system comprising:
   a host computer for providing data transfer commands;
   a disk drive for receiving the data transfer commands and for providing data to the host;
   a host interface for connecting the host computer to the disk drive;
   the host computer comprising:
      a host memory;
      a host interface logic means for transferring data between the host memory and the host interface;
   the disk drive comprising:
      a head disk assembly;
      a media controller;

the head disk assembly comprising:
a disk;
a spindle motor for rapidly rotating the disk;
the disk being formatted to define a plurality of discrete radial positions at which data is recorded in a data track;
each data track being formatted to define a plurality of equally spaced-apart servo sectors, each servo sector defining a wedge relative to an index;
each data track being formatted to define a plurality of data sectors having sync marks, each sync mark defining a discrete circumferential position between the servo sectors;
the media controller comprising;
a servo system for controllably positioning the transducer head over a cylinder rotating under the head;
a means for determining the position status variables;
the position status variables comprising:
the discrete radial position currently passing under the head the wedge currently passing under the head;
a means for storing the position status variables; and
a means for providing the stored position status variables to the host computer.

7. The computer system of claim 6 wherein the position status variables further comprise the discrete circumferential position between servo sectors.

8. The computer system of claim 6 wherein the position status variables further comprise a time stamp.

9. The computer system of claim 6 wherein the means for providing the stored position status variables comprises bus mastering logic.

10. The computer system of claim 9 wherein the position status variables are provided by the disk drive automatically.

11. The computer system of claim 10 wherein the host computer polls the disk drive to receive the position status variables.

12. The computer system of claim 6 wherein the means for providing the stored position status variables comprises polling logic.

13. The computer system of claim 6 wherein the host interface is a P1394 interface.

14. The computer system of claim 6 wherein the host interface is a PCI interface.

15. The computer system of claim 6 wherein the host interface is an ATA interface.

16. The computer system of claim 6 wherein the host interface is a SCSI interface.

17. The computer system of claim 6 wherein the host interface is a Fibre Channel interface.

18. A method of optimizing data transfer commands sent to a disk drive in a computer system comprising a host having a host memory and a disk drive, the method comprising the steps of:
storing disk drive formatting information in the host memory;
storing disk drive performance parameters in the host memory;
shadowing rotational and radial position information in the disk drive;
periodically updating a portion of the host memory to store the shadowed rotational and radial position information; and while periodically updating the portion of host memory:
storing a queue of disk drive data transfer commands in the host memory;
scanning the queue of disk drive data transfer commands and calculating a next disk drive data transfer command to execute from the queue of disk drive data transfer commands based on the updated shadowed rotational and radial position information and the disk drive performance parameters; and
transmitting the next disk drive data transfer command to the disk drive.

19. A method of optimizing data transfer commands sent to an array of disk drives in a computer system comprising a host having a host memory and a plurality of disk drives, the method comprising the steps of:
storing formatting information for each of the plurality of disk drives in the host memory;
storing disk drive performance parameters for each of the plurality of disk drives in the host memory;
shadowing rotational and radial position information in each disk drive;
periodically updating a portion of the host memory to store the shadowed rotational and radial position information for each disk drive; and while periodically updating the portion of host memory:
storing a queue of disk drive data transfer commands which can be applied to any of the plurality of disk drives in the host memory;
selecting a next data transfer command from the queue of disk drive data transfer commands;
selecting a one of the plurality disk drives to receive the next data transfer command based on the updated shadowed rotational and radial position information and the disk drive performance parameters; and
transmitting the next disk drive data transfer command to the selected disk drive.

20. The method of claim 19 wherein the array of disk drives comprises disk drives having different performance parameters.

21. The method of claim 19 wherein the array of disk drives comprises disk drives having different formatting parameters.

22. The method of claim 19, wherein data is mirrored on two or more of the plurality of disk drives.

23. The method of claim 19 wherein data wherein one copy of data is stored in the array of disk drives.

24. A disk drive connectable to a host computer via a host interface for receiving data transfer commands and for communicating position status variables in the disk drive, the disk drive comprising:
a head disk assembly;
a media controller;
the head disk assembly comprising:
a disk;
a spindle motor for rapidly rotating the disk;
the disk being formatted to define a plurality of discrete radial positions at which data is recorded in a data track;
each data track being formatted to define a plurality of equally spaced-apart servo sectors, each servo sector defining a wedge relative to an index;
each data track being formatted to define a plurality of data sectors having sync marks, each sync mark defining a discrete circumferential position between the servo sectors;
the media controller comprising;
a servo system for controllably positioning the transducer head over a cylinder rotating under the head;
a means for determining the position status variables;
the position status variables comprising:
the discrete radial position currently passing under the head the wedge currently passing under the head;

a means for storing the position status variables; and a means for providing the stored position status variables to the host computer;

whereby the host computer can be informed of the position status variables for optimizing the data transfer commands, wherein optimizing the data transfer commands comprises ordering the data transfer commands to the disk drive based on the position status variables.

25. A disk drive connectable to a host computer via a host interface for receiving data transfer commands and for communicating position status variables in the disk drive, the disk drive comprising:

a head disk assembly;

a media controller;

the head disk assembly comprising:

a disk;

a spindle motor for rapidly rotating the disk;

the disk being formatted to define a plurality of discrete radial positions at which data is recorded in a data track;

each data track being formatted to define a plurality of equally spaced-apart servo sectors, each servo sector defining a wedge relative to an index;

each data track being formatted to define a plurality of data sectors having sync marks, each sync mark defining a discrete circumferential position between the servo sectors;

the media controller comprising;

a servo system for controllably positioning the transducer head over a cylinder rotating under the head;

a means for determining the position status variables;

the position status variables comprising:

the discrete radial position currently passing under the head the wedge currently passing under the head;

a means for storing the position status variables; and a means for providing the stored position status variables to the host computer;

whereby the host computer can be informed of the position status variables for optimizing the data transfer commands, wherein optimizing the data transfer commands comprises sequencing the data transfer commands to the disk drive to minimize mechanical latency of the disk drive.

26. A computer system comprising:

a host computer for providing data transfer commands;

a disk drive for receiving the data transfer commands and for providing data to the host;

a host interface for connecting the host computer to the disk drive;

the host computer comprising:

a host memory;

a host interface logic means for transferring data between the host memory and the host interface;

the disk drive comprising:

a head disk assembly;

a media controller;

the head disk assembly comprising:

a disk;

a spindle motor for rapidly rotating the disk;

the disk being formatted to define a plurality of discrete radial positions at which data is recorded in a data track;

each data track being formatted to define a plurality of equally spaced-apart servo sectors, each servo sector defining a wedge relative to an index;

each data track being formatted to define a plurality of data sectors having sync marks, each sync mark defining a discrete circumferential position between the servo sectors;

the media controller comprising;

a servo system for controllably positioning the transducer head over a cylinder rotating under the head;

a means for determining the position status variables;

the position status variables comprising:

the discrete radial position currently passing under the head the wedge currently passing under the head;

a means for storing the position status variables; and a means for providing the stored position status variables to the host computer, wherein the host computer optimizes an order of the data transfer commands provided to the disk drive based on the position status variables.

27. A computer system comprising:

a host computer for providing data transfer commands;

a disk drive for receiving the data transfer commands and for providing data to the host;

a host interface for connecting the host computer to the disk drive;

the host computer comprising:

a host memory;

a host interface logic means for transferring data between the host memory and the host interface;

the disk drive comprising:

a head disk assembly;

a media controller;

the head disk assembly comprising:

a disk;

a spindle motor for rapidly rotating the disk;

the disk being formatted to define a plurality of discrete radial positions at which data is recorded in a data track;

each data track being formatted to define a plurality of equally spaced-apart servo sectors, each servo sector defining a wedge relative to an index;

each data track being formatted to define a plurality of data sectors having sync marks, each sync mark defining a discrete circumferential position between the servo sectors;

the media controller comprising;

a servo system for controllably positioning the transducer head over a cylinder rotating under the head;

a means for determining the position status variables;

the position status variables comprising:

the discrete radial position currently passing under the head the wedge currently passing under the head;

a means for storing the position status variables; and a means for providing the stored position status variables to the host computer, wherein the host computer optimizes a sequence of the data transfer commands provided to the disk drive to minimize mechanical latency of the disk drive.

* * * * *